United States Patent [19]

Sackman et al.

[11] 3,901,857

[45] Aug. 26, 1975

[54] PROCESS FOR THE PRODUCTION OF HIGH MOLECULAR WEIGHT CATIONIC ACRYLAMIDE COPOLYMERS

[75] Inventors: Günter Sackman, Opladen; Gerhard Balle, Cologne; Günter Kolb, Leverkusen; Friedhelm Muller, Odenthal, all of Germany

[73] Assignee: Bayer Aktiengesellschaft, Leverkusen, Germany

[22] Filed: Nov. 7, 1973

[21] Appl. No.: 413,646

[30] Foreign Application Priority Data
Nov. 11, 1972  Germany............................ 2255391

[52] U.S. Cl.............. 260/79.3 M; 162/164; 210/54; 260/29.6 R; 260/86.1 N
[51] Int. Cl............................................ C08f 15/02
[58] Field of Search................... 260/86.1 N, 79.3 M

[56] References Cited
UNITED STATES PATENTS
3,661,880    5/1972    Markert et al................ 260/86.1 N Primary Examiner—Harry Wong, Jr.
Attorney, Agent, or Firm—Connolly and Hutz

[57] ABSTRACT

High molecular weight cationic copolymers of (meth-)acrylamide and tertiary or quaternary aminoalkyl(-meth)acrylates are produced by copolymerization of said monomers in the presence of a redox system of a water-soluble percompound and of a compound containing at least one primary amine group or a water-soluble salt thereof in aqueous oxygen-free solution at a temperature of from 10° to 40°C.

3 Claims, No Drawings

PROCESS FOR THE PRODUCTION OF HIGH MOLECULAR WEIGHT CATIONIC ACRYLAMIDE COPOLYMERS

The invention relates to a process for the production of high molecular weight cationic acrylamide copolymers, and in particular to a process for the production of high molecular weight copolymers of (meth)acrylamide and tertiary or quaternary aminoalkyl(meth)acrylates in dilute aqueous solution.

It is known that copolymers of acrylamide or methacrylamide and compounds corresponding to the general formula (I):

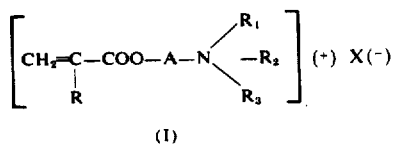

(I)

in which R represents a hydrogen atom or a methyl group; $R_1$ represents a hydrogen atom or an alkyl group with from 1 to 4 carbon atoms; $R_2$ and $R_3$ each represents an alkyl group with from 1 to 4 carbon atoms; A represents a linear or branched aliphatic radical with from 2 to 4 carbon atoms; and $X^{(-)}$ represents a negative group capable of salt formation with the amine nitrogen, such as for example halide, acetate, methosulphate or tolylsulphonate, can be prepared in aqueous solution using water-soluble radical initiators. Cationic acrylamide copolymers of this kind have long been used in the paper industry as retention agents. However, since these products are only really effective when they have extremely high molecular weights (approximately $10^7$), the polymerisation reactions have to be carried out with monomer concentrations in excess of 10 % by weight (cf. U.S. Pat. No. 3,239,496).

In addition, it is known from British patent specification No. 1,249,504 that the copolymerisation of acrylamide and aminoalkylacrylates in aqueous solutions has to be carried out with a monomer concentration of from 40 to 75 % by weight in order to obtain extremely high molecular weights. Unfortunately, solutions with much higher concentrations and higher molecular weight as these are extremely difficult to dilute to the low concentrations required for their application as retention agents and dehydration accelerators.

An object of the present invention was to find an improved process for the production of ready-to-use or readily and quickly dilutable aqueous solutions of high molecular weight copolymers of acrylamide and/or methacrylamide with aminoalkylacrylates corresponding to general formula (I). The resulting solutions may be used as paper auxiliaries, for cleaning and clarifying effluents, and for other purposes mentioned in the application.

According to the invention, this object is achieved by copolymerising the monomers in the form of from 1 to less than 10 % by weight aqueous solutions thereof in the presence of a redox system of from 0.005 to 0.1 % by weight of water-soluble percompounds and of from 0.005 to 0.1% by weight of compounds containing at least one primary amino group or water-soluble salts thereof (based in each case on the monomer total used), and optionally in the presence of at most 10 % by weight of a water-soluble metal salt, based on the sum of water and metal salt, at temperatures of from 10° to 40°C.

Accordingly, the invention provides a process for the production of a high molecular weight cationic copolymer in which acrylamide or methacrylamide is polymerised with an amino ester corresponding to the general formula (I):

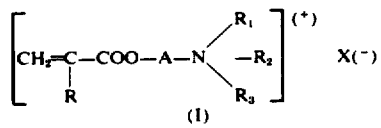

(I)

in which:
R represents a hydrogen atom or a methyl group;
$R_1$ represents a hydrogen atom or an alkyl group with from 1 to 4 carbon atoms;
$R_2$ and $R_3$ each represents an alkyl group with from 1 to 4 carbon atoms;
A represents a linear or branched aliphatic radical with from 2 to 4 carbon atoms;
and $X^{(-)}$ represents a negative group capable of salt formation with the amine nitrogen such as, for example, halide, acetate, methosulphate or tolylsulphonate, the monomers being in a concentration of from 1 to 10% by weight in an aqueous oxygen-free solution and the polymerisation taking place in the presence of a redox system comprising from 0.005 to 0.1 % by weight of a water-soluble percompound and from 0.005 to 0.1% by weight of a compound containing at least one primary amino group or a water-soluble salt thereof (based in each case on the monomer total used), and optionally in the presence of at most 10 % by weight of a water-soluble metal salt, based on the sum of water and metal salt, at a temperature of from 10° to 40°C.

Acrylamide and/or methacrylamide, preferably acrylamide, can be used as monomers.

In the above formula for the amino esters, R preferably represents hydrogen or methyl, A an ethylene group, $R_1$ hydrogen, $R_2$ and $R_3$ a methyl or ethyl group and $X^-$ chloride. The following are mentioned as examples: dimethylaminoethylacrylate, dimethylaminoethylmethacrylate, diethylaminoethylacrylate, diethylaminoethylmethacrylate, and the hydrochlorides of these compounds.

The (meth)acrylamide and amino ester are copolymerised in the form of 1 % by weight to less than 10 % by weight, preferably from 2 to 6 % by weight, aqueous solutions.

The monomer mixture used consists of from 70 to 95 % by weight of (meth)acrylamide and of from 5 to 30 % by weight of the amino ester specified in the formula.

The copolymer preferably contains the amino ester monomers in the ratio in which they were originally used. If their proportion amounts to less than 5% by weight, they show inadequate cation activity, whereas if their proportion is greater than 30% by weight, the resulting products do not have very high molecular weights.

The monomer units incorporated in the copolymers are present in a substantially statistical distribution.

The copolymers produced in accordance with the invention have intrinsic viscosities $[\eta]$ of from 12 to 25

(dl/g), as measured in 0.9 % by weight NaCl solution at $t = 25°C$. The aqueous copolymer solutions obtained contain from 1 to 10 % by weight, preferably from 2 to 6 % by weight, of copolymer solids and have viscosities of from 6,000 to 80,000 cP, preferably from 10,000 to 40,000 cP, at $t = 20°C$.

Redox systems suitable for use as polymerisation initiators may contain water-soluble compounds such as an alkali metal or ammonium persulphate, hydrogen peroxide, tert.-butyl hydroperoxide or percarbonates and perphosphates as their oxidising component, and, as reducing agents, compounds, containing at least one primary amino group, which are soluble in water either as such or in the form of their salts, such as diethylene triamine, triethylene tetramine, methylamine, n-butylamine, isobutylamine, cyclohexylamine, p-toluidine or aminoethylmethacrylate hydrochloride etc.

It is preferred to use redox systems of potassium persulphate or ammonium persulphate with aminoethylmethacrylate hydrochloride, cyclohexylamine or isobutylamine.

The percompounds or the compounds containing at least one primary amino group are each used in quantities of from 0.005 to 0.1 % by weight, based on the monomer total.

Copolymerisation may optionally be carried out in the presence of water-soluble metal salts such as sodium chloride, sodium sulphate, magnesium chloride, aluminum sulphate or sodium acetate, etc. These simple electrolytes can be present in the polymerisation mixture in quantities of up to 10 % by weight, based on the sum of water and water-soluble metal salt.

It was surprising in view of the prior art that, despite the lower monomer concentration, the process according to the invention should lead to high molecular weight (meth)acrylamide copolymers. This was only possible because of the selection of the special polymerisation conditions, the combination of the special conditions according to the invention being of crucial importance.

In cases where the [$\eta$]-values of the cationic copolymers according to the invention are less than 12 (dl/g), for example in cases where secondary amines are used for their production, the solutions thereof show only a very low retention effect and have to be added to paper pulp in uneconomically large quantities; otherwise excessive quantities of fibres and fillers would enter the effluent. In the preparation of these polymer solutions, the polymerisation conditions specified above have to be strictly observed because otherwise the high molecular weights required cannot be obtained.

This occurs, for example, in cases where, instead of primary amines, Na-pyrosulphite is combined with a radical former initiating the polymerisation reaction to form a redox system, or in cases where a quantity of primary amine of 0.10 % by weight is distinctly exceeded, or in cases where polymerisation is carried out at temperatures outside the range specified. Under all these conditions, the [$\eta$]-values measured in 0.9 % NaCl solution are in some cases distinctly below 12 (dl/g).

This solution polymerisation reaction also has to be carried out in the strict absence of air and chain-terminating impurities in the water.

For example, it is advisable to use boiled, desalted water (for example electrolyte water) and to free the solution of monomers from gaseous, dissolved constituents, such as oxygen and carbon dioxide, by blowing pure nitrogen through it before the initiator is added. Instead of using boiled electrolyte water, it would also be possible to subject the desalted water to incipient distillation to distil off approximately 10 % of the quantity of water.

The products obtained in accordance with the invention have a wide range of applications both in the paper industry and also in the purification and clarification of effluents. Thus, they produce a marked retention of fibres and fillers on the wire of papermaking machines in the production of paper, for example irrespective of the pH-value, and permit an increase in the rate at which water is removed from the paperweb without affecting anionic optical brighteners to any appreciable extent.

For this purpose, their aqueous solutions can be directly added to the breast box of a papermaking machine in dilute or concentrated form. This not only saves a considerable amount of time, but it also represents a simplification by comparison with the use of more heavily concentrated, usually gelled solutions, or of powdered cationic polyacrylamides because the dilution or dissolution of products such as these involves a fairly laborious, complicated process.

In addition, the use of highly concentrated solutions or of powders involves the risk of incompletely dissolved fractions entering the papermaking machine and leading to disturbances during paper production and to flaws in the paper. Also, the product according to the invention can be used for clarifying and purifying industrial and communal effluents by sedimentation, filtration and flotation, for the production of mordant layers in photographic systems and as soil-improving agents, the extremely high molecular weight of the copolymers according to the invention making very small quantities sufficient to obtain excellent effects.

The percentage contents quoted in the following Examples relate to weight unless otherwise stated.

. EXAMPLE 1

170 liters of desalted water are introduced into a 250 liter steel autoclave equipped with a stirring mechanism and surmounted by a distillation bridge. The autoclave is then heated to 80°C and 12 liters of water are distilled off in vacuo. Pure nitrogen at 2 atms is then introduced into the autoclave and the contents thereof are cooled to 25°C. A solution of 7,200 g of acrylamide and 1,800 g of diethylaminoethylmethacrylate hydrochloride in 9.4 liters of boiled, desalted water is then drawn into the autoclave through a capillary. Following introduction of this solution, a vigorous stream of nitrogen is bubbled through the solution for about 1 hour, after which the autoclave is closed. Thereafter, 1.20 g of aminoethylmethacrylate hydrochloride (amine component of the redox system), dissolved in 2.16 liters of boiled, desalted water, are initially introduced quickly through a dropping funnel whilst nitrogen is passed over, followed by the dropwise addition over a period of 1 hour of 2.40 g of potassium persulphate in 2.52 liters of boiled, desalted water. On completion of the dropwise addition, the autoclave is closed and nitrogen at approximately 2 atms is introduced. After a reaction time of 24 hours at 25° to 30°C, a crystal clear, highly viscous solution (32,000 cP at $t = 20°C$) is formed, which can be forced out of the reaction vessel by applying an excess pressure.

The cationic polyacrylamide thus produced has an intrinsic viscosity [η] of 21.76 (dl/g), as measured in 0.9 % NaCl solution at $t = 25°C$. The copolymer consists of copolymerised, substantially statistically distributed units of 80 % by weight of acrylamide and 20 % by weight of diethylaminoethylmethacrylate hydrochloride.

EXAMPLE 2

2,025 ml of boiled, desalted water are introduced into a 3 liter stirrer-type vessel equipped with an internal thermometer, a nitrogen inlet, two dropping funnels and a nitrogen outlet, and 120 g of acrylamide and 30 g of dimethylaminoethylmethacrylate are dissolved therein. 210 ml of 10 % HCl are then added for neutralisation and a vigorous stream of pure nitrogen is bubbled through the solution for 30 minutes. 20 mg of aminoethylmethacrylate hydrochloride dissolved in 30 ml of boiled desalted water are then added dropwise as quickly as possible through one of the dropping funnels at a temperature of 25°C, whilst 60 mg of potassium persulphate, dissolved in 30 ml of boiled, desalted water, are introduced through the second dropping funnel over a period of 1 hour. After a polymerisation time of 24 hours, the product has an intrinsic viscosity [η] of 16.45 (dl/g), as measured in 0.9 % NaCl solution at $t = 25°C$. The copolymer contains 80% by weight of acrylamide and 20 % by weight of dimethylaminoethylmethacrylate in copolymerised form and in substantially statistical distribution. The aqueous solution of the copolymer obtained in accordance with the invention has a viscosity of 29,000 cP at $t = 20°C$.

EXAMPLE 3

The procedure is as in Example 1, except that the solution has a monomer concentration of only 3 % by weight (Example 1 = 5 % by weight). The end product has an intrinsic viscosity [η] of 13.12 (dl/g), as measured in 0.9 % NaCl solution at $t = 25°C$, and substantially the same composition as the copolymer of Example 1. The aqueous copolymer solution has a viscosity of 13,000 cP at $t = 20°C$.

EXAMPLE 4

A solution of 100 g of acrylamide and 25 g of diethylaminoethylmethacrylate hydrochloride in 2,325 ml of boiled, desalted water (monomer concentration: 5.0 % by weight) is drawn into an evacuated 3-liter stirrer-type vessel equipped with a thermometer, a nitrogen inlet and a nitrogen outlet and with two dropping funnels. A stream of pure nitrogen is then passed through the solution for 30 minutes, after which 12.5 mg of cyclohexylamine dissolved in 25 ml of boiled, desalted water are quickly added, followed by the dropwise addition over a period of 30 minutes of 50 mg of potassium persulphate dissolved in 25 ml of boiled, desalted water. Polymerisation is then carried out at a temperature of from 25° to 30°C over a period of 24 hours, during which a gentle stream of nitrogen is passed over. The aqueous solution has a viscosity of 31,000 cP at $t = 20°C$. The product has an intrinsic viscosity [η] of 20.0 (dl/g), (as measured in 0.9 % NaCl solution at $t = 25°C$). The statistical copolymer consists of copolymerized units of 80 % by weight of acrylamide and 20 % by weight of diethylaminoethylmethacrylate hydrochloride.

EXAMPLE 5

The procedure is as in Example 4, except that 12.5 mg of isobutylamine are used instead of cyclohexylamine. The aqueous copolymer solution has a viscosity of 29,800 cP at $t = 20°C$. The product has an intrinsic viscosity [η] of 17.24 (dl/g), (as measured in 0.9 % NaCl solution at $t = 25°C$.) The composition of the copolymer corresponded to the product of Example 4.

COMPARISON EXAMPLE 1

These tests show how higher molecular weights are obtained with the redox catalyst system of percompound and aminoethylmethacrylate hydrochloride in contrast with a system of percompound and sodium pyrosulphite under otherwise the same reaction conditions. In addition, test 7 of this Example shows that the use of a secondary amine, only gives polymers with [η]-values of less than 10 (dl/g).

| Test Number | Catalyst system | Temperature °C | Monmer concentration | [η] (dl/g) |
|---|---|---|---|---|
| 1 | potassium persulphate/aminoethylmethacrylate hydrochloride (according to the invention) | 25–30 | 5 % | 19.20 |
| 2 | potassium persulphate/Na-pyrosulphite (comparison) | 25–30 | 5 % | 10.56 |
| 3 | (H₂O₂/aminoethylmethacrylate hydrochloride (according to the invention) | 25–30 | 5 % | 18.09 |
| 4 | (H₂O₂/Na-pyrosulphite (comparison) | 25–30 | 5 % | 0.32 |
| 5 | t-butylhydroperoxide/aminoethylmethacrylate hydrochloride (according to the invention | 25–30 | 5 % | 18.31 |
| 6 | t-butylhydroperoxide/Na-pyrosulphite (comparison) | 25–30 | 5 % | 10.84 |
| 7 | potassium-persulphate/dibutylamine (comparison) | 25–30 | 5 % | 4.98 |

COMPARISON EXAMPLE 2

The following Table clearly shows how the molecular weights of the cationic polyacrylamides are governed by the concentration of the amines in the redox catalyst system. With concentrations of up to 0.1 % by weight of amine, based on the monomer concentration, [η]-values of more than 12 (dl/g) are obtained, whereas the [η]-values obtained with amine concentrations of more than 0.1 % by weight, based on the monomer concentration, are less than 12 (dl/g).

| Test number | Amine | Concentration of the amine | $[\eta]$ dl/g |
|---|---|---|---|
| 1 | triethylenetetramine | 0.01 % | 16.84 |
| 2 | triethylenetetramine | 1.00 % | 1.17 |
| 3 | n-butylamine | 0.10 % | 19.88 |
| 4 | n-butylamine | 1.00 % | 5.94 |
| 5 | cyclohexylamine | 0.01 % | 20.00 |
| 6 | cyclohexylamine | 1.00 % | 6.87 |
| 7 | isobutylamine | 0.01 % | 17.24 |
| 8 | isobutylamine | 1.00 % | 4.88 |

COMPARISON EXAMPLE 3

The following Table demonstrates the dependence of the $[\eta]$-value upon the polymerisation temperature. Whereas the $[\eta]$-values are greater than 12 (dl/g) at reaction temperatures of from 10° to 40°C, it can be seen from the Table that they fall off at temperatures outside this range.

(In every case, K-persulphate/aminoethylmethacrylate hydrochloride was used as the catalyst system; the monomer concentration amounted to 5 % by weight).

| Test number | Polymerisation temperature °C | | $[\eta]$ dl/g |
|---|---|---|---|
| 1 | 0 | | 3.12 |
| 2 | 10 | according to | 13.12 |
| 3 | 25 | the invention | 19.20 |
| 4 | 40 | | 12.82 |
| 5 | 50 | | 10.03 |

APPLICATION EXAMPLE 1

A paper was produced on a test papermaking machine (Kemmerer system) at pH 4.8 from a raw material of 70 % of bleached softwood and 30 % of bleached hardwood sulphite pulp to which 25 % of China Clay, 1 % of rosin size (sodium abietate) and 3 % of aluminum sulphate (based in each case on dry pulp) had been added. A heavily water-diluted solution (about 0.05 % by weight) of the product obtained in accordance with Example 2 was continuously added just before the breast box of the papermaking machine. The retention effect was determined by measuring the solids content of the effluent from the papermaking machine.

The following Table shows the results; the quantities added are expressed as 100% polyacrylamide derivatives (according to Example 2), based on dry pulp.

| Quantity added | Solid content of effluent |
|---|---|
| Without retention agent | 585 mg/l |
| 0.003 % of polyacrylamide derivative | 320 mg/l |
| 0.006 % of polyacrylamide derivative | 197 mg/l |
| 0.009 % of polyacrylamide derivative | 140 mg/l |
| 0.012 % of polyacrylamide derivative | 122 mg/l |

APPLICATION EXAMPLE 2

The degree of grinding according to Schopper-Riegler was determined as a measure of the acceleration in water-removal that can be expected in a practical papermaking machine. Mixed paperwaste was beaten-up in a high-speed stirrer and used as fibrous material in the neutal pH- range. A dilute solution (about 0.05 % by weight) of the polyacrylamide derivative obtained in accordance with Example 4 was added to the fibrous material just before it was introduced into the Schopper-Riegler apparatus.

The following results were obtained, the quantities added being expressed as 100 % polyacrylamide derivative, based on dry fibrous material:

| Quantity added | Degree of grinding according to Schopper-Riegler |
|---|---|
| Without retention agent | 58°SR |
| 0.02 % of polyacrylamide derivative | 54°SR |
| 0.05 % of polyacrylamide derivative | 48°SR |
| 0.10 % of polyacrylamide derivative | 37°SR |

We claim:
1. A process for the production of high molecular weight cationic copolymers which comprises copolymerizing an oxygen-free aqueous solution containing 1 to less than 10% by weight of a monomer mixture in the presence of a Redox catalyst system of from 0.005 to 0.1% by weight of a water-soluble percompound and of from 0.005 to 0.1% by weight of at least one compound selected from the group consisting of diethylene triamine, triethylene tetramine, methylamine, n-butylamine, isobutylamine, cyclohexylamine, p-toluidine, water-soluble salts of the aforesaid amines and aminoethylmethacrylate hydrochloride at a temperature of from 10° to 40°C., said monomer mixture comprising 70 to 95% by weight of acrylamide or methacrylamide and 5 to 30% by weight of a compound of the formula

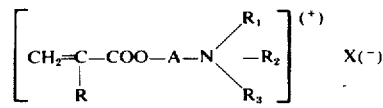

wherein R is hydrogen or methyl, $R_1$ is hydrogen or alkyl having 1 to 4 carbon atoms, $R_2$ and $R_3$ are each, independently of the other, alkyl having 1 to 4 carbon atoms, A is a linear or branched aliphatic radical having from 2 to 4 carbon atoms and $X^{(-)}$ is a member selected from the group consisting of halide, acetate methosulphate and tolyl sulphonate.

2. The process of claim 1 wherein said copolymerization is carried out in the presence of up to 10% by weight of a water-soluble metal salt, based on the combined weight of water and metal salt.

3. The process of claim 1 wherein R is hydrogen or methyl, A, is ethylene, $R_1$ is hydrogen, each of $R_2$ and $R_3$, independently of the other, are ethyl and $X^{(-)}$ is chloride.

* * * * *